United States Patent
Cvengros

(10) Patent No.: US 7,434,829 B2
(45) Date of Patent: Oct. 14, 2008

(54) INTERIOR PANEL HAVING AIRBAG DEPLOYMENT DOOR

(75) Inventor: Donald James Cvengros, Canton, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 188 days.

(21) Appl. No.: 11/112,081

(22) Filed: Apr. 22, 2005

(65) Prior Publication Data

US 2006/0237952 A1 Oct. 26, 2006

(51) Int. Cl.
*B60R 21/20* (2006.01)
*B29C 45/00* (2006.01)

(52) U.S. Cl. ............. 280/728.3; 264/328.7; 264/255; 264/328.12

(58) Field of Classification Search ............. 280/728.3, 280/732; 264/255, 328.7, 328.12
See application file for complete search history.

(56) References Cited

U.S. PATENT DOCUMENTS

| | | | |
|---|---|---|---|
| 5,458,361 A * | 10/1995 | Gajewski | 280/728.3 |
| 5,533,748 A | 7/1996 | Wirt et al. | |
| 5,618,485 A | 4/1997 | Gajewski | |
| 5,776,522 A | 7/1998 | Budnick | |
| 5,947,511 A * | 9/1999 | Usui et al. | 280/728.3 |
| 5,997,030 A | 12/1999 | Hannert et al. | |
| 6,050,594 A | 4/2000 | Budnick | |
| 6,065,894 A * | 5/2000 | Wasson et al. | 403/2 |
| 6,210,614 B1 | 4/2001 | Gardner, Jr. et al. | |
| 6,214,442 B1 | 4/2001 | Mizutani et al. | |
| 6,296,802 B1 | 10/2001 | Blazaitis et al. | |
| 6,398,256 B1 | 6/2002 | Saito | |
| 6,413,460 B1 * | 7/2002 | Wisniewski et al. | 264/254 |
| 6,453,535 B1 | 9/2002 | Nicholas | |
| 6,568,707 B2 | 5/2003 | Hier et al. | |
| 6,644,685 B2 * | 11/2003 | Sun et al. | 280/728.3 |
| 6,733,713 B2 * | 5/2004 | Takahashi | 264/328.7 |
| 6,739,628 B2 * | 5/2004 | Kanner et al. | 285/4 |
| 6,756,004 B2 * | 6/2004 | Davis et al. | 264/255 |
| 7,100,941 B2 * | 9/2006 | Riha et al. | 280/728.3 |
| 7,108,825 B2 * | 9/2006 | Dry et al. | 264/328.7 |
| 7,118,123 B2 * | 10/2006 | Weissert et al. | 280/728.3 |
| 2003/0020263 A1 | 1/2003 | Preisler | |
| 2003/0189321 A1 * | 10/2003 | Takahashi | 280/728.3 |
| 2004/0043683 A1 | 3/2004 | Muench | |
| 2005/0244610 A1 * | 11/2005 | Cvengros et al. | 428/137 |
| 2006/0214399 A1 * | 9/2006 | Okamoto et al. | 280/728.3 |
| 2006/0255569 A1 * | 11/2006 | Weissert et al. | 280/728.3 |
| 2008/0073933 A1 * | 3/2008 | Heinze et al. | 296/146.7 |

* cited by examiner

*Primary Examiner*—Kevin Hurley
*Assistant Examiner*—Karen Amores
(74) *Attorney, Agent, or Firm*—Brinks Hofer Gilson & Lione

(57) ABSTRACT

An interior panel for a motor vehicle provides a deployment door for an airbag assembly supported behind the panel. The deployment door has a peripheral end surface connected to the surrounding panel substrate, the connection being formed by a knit line. In this manner, a seamless deployment door for an airbag assembly is provided with a clean and consistent appearance, while at the same time quickly and easily breaking free from the surrounding panel.

19 Claims, 2 Drawing Sheets

INTERIOR PANEL HAVING AIRBAG DEPLOYMENT DOOR

FIELD OF THE INVENTION

The present invention relates generally to the formation of a deployment door in a vehicle instrument panel, and more particularly relates to a seamless deployment door.

BACKGROUND OF THE INVENTION

Most modern vehicles include inflatable restraint apparatus having deployable airbags positioned in many locations throughout an automotive vehicle. Generally, an interior panel includes a deployment door formed into the panel which is designed to break free upon deployment of the airbag.

A primary aim of the airbag assembly is to control the opening of the deployment door to avoid break explosion and the possibility of flying parts. Clean deployment is achieved in some airbag assemblies by providing a deployment door with a seam, meaning the door is not physically interconnected with the surrounding interior panel. Unfortunately, the seam in the interior panel around the deployment door may not be visually appealing. Thus, in other airbag assemblies clean deployment is provided, in part, by a "seamless" deployment door having aggressive pre-weakening of the outline of the door (typically by laser scoring, mechanical scoring, etc.) by cutting the material or creating perforations. While this weakening of seamless deployment doors is typically done on the underside of the panel, there still exists a potential for creating blemishes or other disturbances on the exposed class "A" surface. Furthermore, there is a potential to have an uneven break or tear in the deployment door since the plastic is not completely cut through. Accordingly, there exists a need to provide a seamless deployment door which quickly and reliably breaks free from the surrounding panel while eliminating the potential for surface blemishes due to pre-weakening of the door outline.

BRIEF SUMMARY OF THE INVENTION

The present invention provides an interior panel for a motor vehicle having an airbag assembly supported behind the panel. The panel generally includes a panel substrate having opposing first and second surfaces. The first surface is exposed to the interior of the motor vehicle. A deployment door is formed in the panel substrate and has a peripheral end surface connected to the surrounding panel substrate. The connection between the deployment door and the surrounding panel substrate is formed by a knit line. In this manner, a seamless deployment door for an airbag assembly is provided with a clean and consistent appearance, while at the same time quickly and reliably breaking free from the surrounding panel.

According to more detailed aspects, the outer periphery of the deployment door defines a reduced thickness portion having a thickness less than the thickness of the remainder of the deployment door. The airbag assembly engages the reduced thickness portion of the deployment door. The reduced thickness portion and the surrounding panel substrate define a groove, which is preferably square or rectangular in shape. The groove may be exposed to the interior of the vehicle, or alternatively may be exposed to the airbag assembly. In the latter case, a portion of the airbag assembly may engage the groove. Preferably, the interior panel is formed by injection molding, and the groove is formed by a projection of the cavity or core to provide consistency to the size, shape and position of the groove.

According to still more detailed aspects, the peripheral end surface is stepped to define a first end surface portion spaced inwardly from a second end surface portion, wherein the second end surface portion is connected to the surrounding panel substrate. The first end surface portion is exposed to the interior of the vehicle, and an end of the knit line may also be exposed to the interior of the vehicle.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
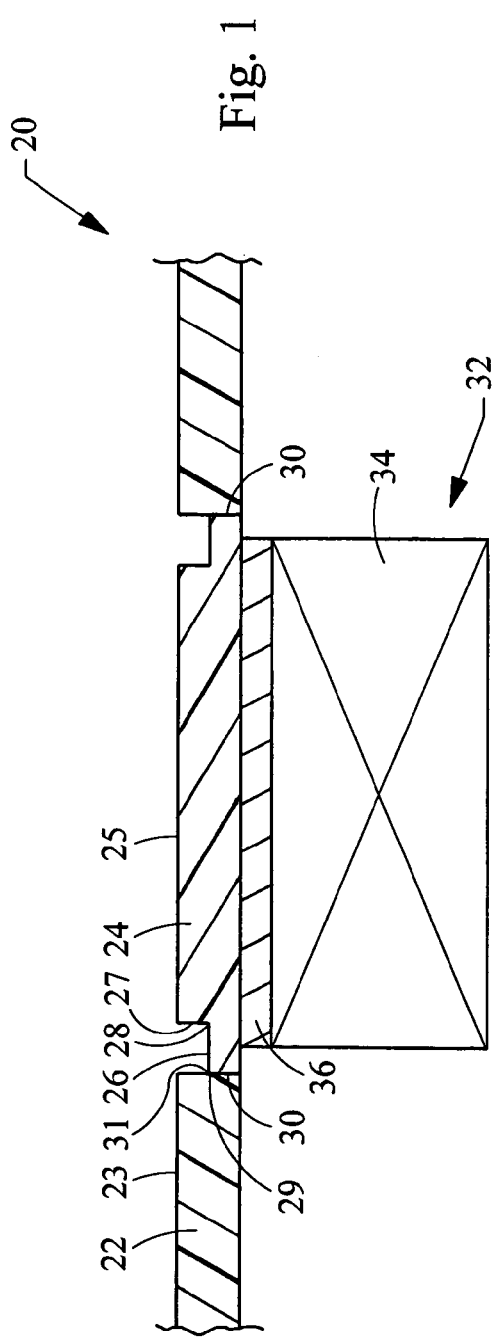
FIG. 1 is a cross-sectional view of an interior panel and deployment door for an airbag assembly constructed in accordance with the teachings of the present invention.

Turning now to the figures, FIG. 1 depicts an interior panel 20 for a motor vehicle constructed in accordance with the teachings of the present invention. The interior panel 20 generally includes a panel substrate 22 having a deployment door 24 formed therein. An airbag assembly 32 is suitably supported behind the deployment door 24 and generally includes an airbag module 34 and a reaction plate 36, as is known in the art. Upon the detection of a crash event or the potential for such an event, the airbag module 34 deploys an airbag which exerts a force on the deployment door 24 causing it to break free from the surrounding panel substrate 22, as is also known in the art.

The panel substrate 22 includes a surface 23 exposed to the interior of the vehicle, and likewise the deployment door 24 includes a surface 25 exposed to the interior of the vehicle, both surfaces commonly referred to as the "class A" surface. The outer periphery of the deployment door 24 defines a reduced thickness portion 26 having a thickness less than the thickness of the remainder of the deployment door 24. Accordingly, it can be seen that the reduced thickness portion 26 and the surround panel substrate 22 define a groove 28 which generally extends around the outer periphery of the deployment door 24.

Stated another way, the peripheral end surface is stepped to define a first end surface portion 27 spaced inwardly from a second end surface portion 29. The second end surface portion 29 is connected to the surrounding panel substrate 22 by a knit line 30. The structure of a knit line is well known in the art, and generally represents a flow boundary between two plastic layers which are not completely blended together, but rather form a bond therebetween through the slight re-melting of the plastic material of one of the structures. One method for forming the knit line will be described later hereinbelow with reference to FIGS. 2-3.

As shown in FIG. 1, the airbag assembly 32 is connected to the deployment door 24 and engages the same in an area proximate the groove 28 and reduced thickness portion 26. In this manner, the deployment door 24 may be cleanly deployment from the surrounding panel substrate 22 through the application of force adjacent the knit line 30 and groove 28. The force exerted by the airbag of the airbag module 34 easily overcomes the bond between the deployment door 24 provided by the knit line 30 and the panel substrate 22 to free the door and provide an opening through which the airbag may be fully deployed.

The groove 28 is structured to assist the breaking of the knit line 30, and is preferably square or rectangular in shape although it may take other forms. The width of the groove 28 is also preferably greater than the thickness of the knit line 30. As shown in FIG. 1, the groove 28 is exposed to the interior of the vehicle, i.e. it is formed in the class A surface 25 of the deployment door 24. Thus, the groove 28 hides the knit line 30. Furthermore, as the deployment door 24 is physically connected to the surrounding panel substrate 22, the structure is not a "seamless" door 24 but rather the groove 24 forms style lines.

The interior panel 20 of the present invention may be formed by injection molding, as will be described with reference to FIGS. 2 and 3. A molding tool 40 generally includes a cavity 42 (i.e. upper die) and a core 44 (i.e. lower die). The cavity 42 and core 44 are positioned relative to one another to create a space therebetween, and a plastic resin may be injected into the space in its molten state. This interior space is divided between a first chamber 50 in which the deployment door 24 is formed, and a second chamber 52 in which the panel substrate 22 is formed. Specifically, the core 44 includes a slide 46 which can operate between a closed position shown in FIG. 2 and an open position shown in FIG. 3. In the closed position, the slide 46 engages a projection 48 formed in the cavity 42. As will be described below, the projection 48 is used to form the groove 28 in the deployment door 24.

Figure 2:
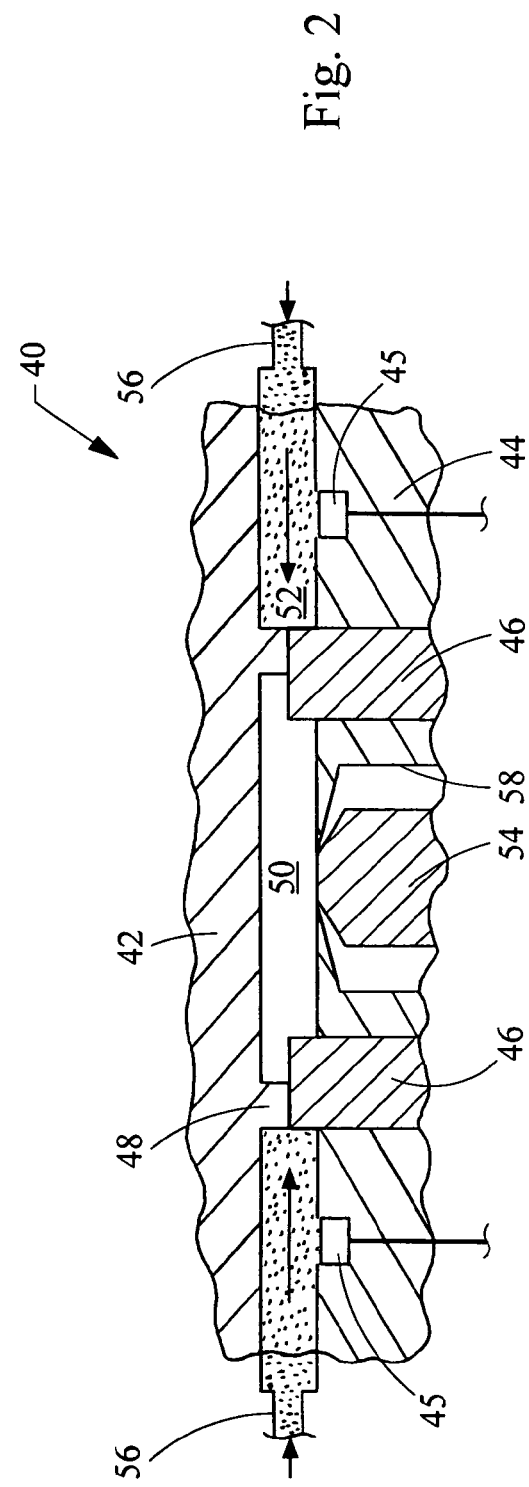
FIG. 2 is a cross-sectional view of a molding tool used in forming the instrument panel depicted in FIG. 1.
Figure 3:
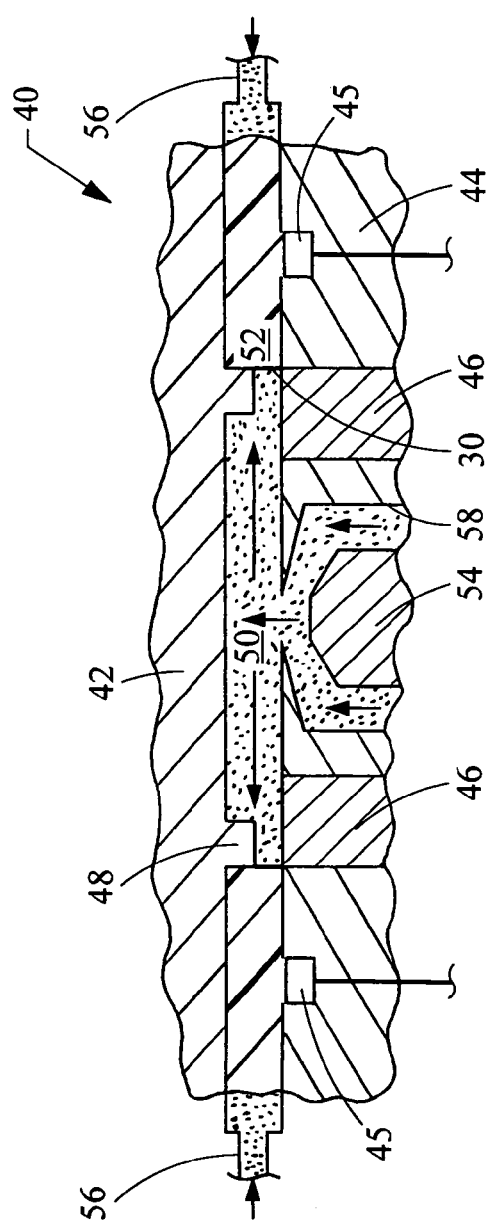
FIG. 3 is a cross-sectional view of the molding tool depicted in FIG. 2, but showing a different stage of the molding process.

Once the cavity 42, core 44 and slide 46 are positioned as shown in FIG. 2, molten resin may be flowed through a gate 56, which is preferably a sequential valve gate containing a series of gates, as is known in the art. The resin flows into the second chamber 52, while a pressure sensor 45 is used to monitor the flow of resin and determine when the whole chamber 52 is filled. At this point, the gate 56 is closed and the resin in the second chamber 52 begins to cool and harden.

Subsequently, the slide 46 is translated to its open position shown in FIG. 3. Around the same time, a second gate 54 is opened from its closed position (shown in FIG. 2) such that resin may flow through an internal passageway 58 formed in the core 44. In this manner, resin is allowed to flow into the first chamber 50 and fills the tool. Accordingly, it will be seen that the molten resin flowing through second gate 54 engages the partially cooled resin/plastic situated in the second chamber 52. As such, a small portion of the resin/plastic in the second chamber 52 will re-melt slightly to form a bond between the resin/plastic in the first chamber 50 and the resin/plastic in the second chamber 52, thereby forming knit line 30.

Finally, the part is ejected from the molding tool 40, resulting in an interior panel 20 having the panel substrate 22 with a deployment door 24 formed therein. The knit line 30 forms a seam by which the deployment door 24 may be disconnected from the surrounding panel substrate 22 via deployment of the airbag assembly 32. The airbag assembly 32 may then be attached to the interior panel 20 through conventional means. It can also be seen that the projection 48 of the cavity 42 results in the formation of groove 28 and reduced thickness portion 26 of the deployment door 24. The groove 28 not only hides the knit line 30, but also presents a weakened area by which the door 24 may be deployed. By way of the process described above, the groove 28 will always have the same appearance through its consistency in the size, shape and position. As such, blemishes or other visual imperfections are eliminated in the class A surface 23, 25.

Figure 4:
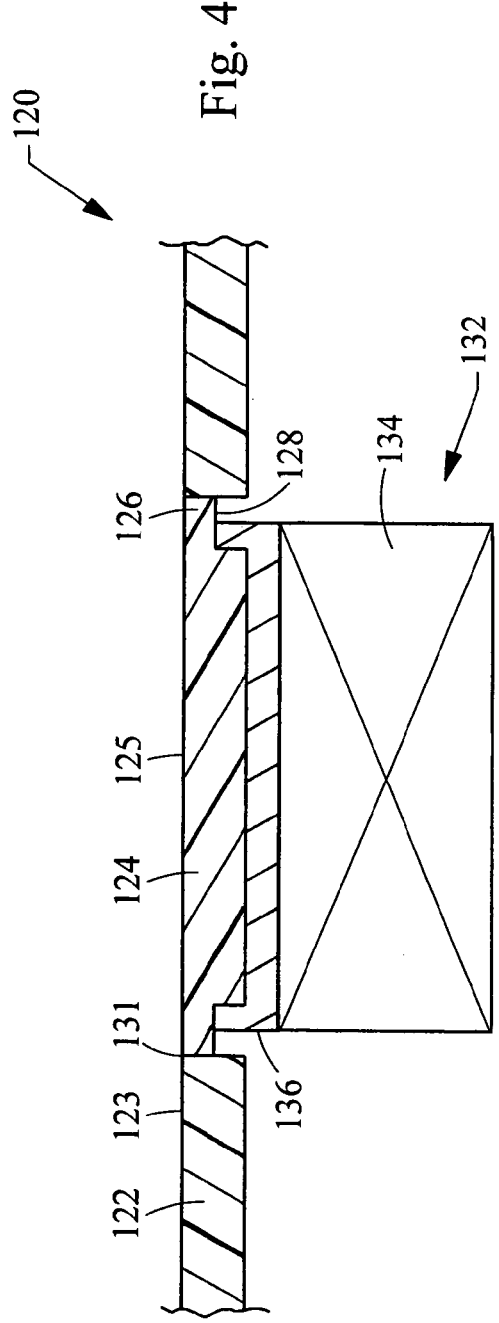
FIG. 4 is a cross-sectional view of an alternate embodiment of an instrument panel and deployment door for an airbag assembly constructed in accordance with the teachings of the present invention.

Turning now to FIG. 4, another embodiment of the interior panel 120 has been depicted in cross-section. In the prior embodiment of FIGS. 1-3, the groove 28 was exposed to the interior of the vehicle. In the present embodiment, however, the deployment door 124 and interior panel 122 define a groove 128 which is not exposed to the interior of the vehicle. Essentially, the interior panel 120 may be formed by the same molding tool 40 described above with reference to FIGS. 2 and 3, but the panel 120 may be flipped prior to attachment of the airbag assembly 132. That is, the formerly hidden surfaces of the deployment door 124 and panel substrate 122 now form the class A surfaces 123, 125. Alternatively, the slide 46 could be formed in the cavity 42, while the projection 48 is formed in the core 44.

In either case, the airbag assembly 132 may include an airbag module 134 and reaction plate 136 which directly engages the groove 128. In essence, the groove 128 may be used as a connecting structure between the deployment door 124 and the airbag assembly 132 to further facilitate in the clean and rapid deployment of the door 124. An end 131 of the knit line 30 is exposed to the interior of the vehicle.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An interior panel for a motor vehicle having an airbag assembly supported behind the interior panel, the interior panel comprising:
    a panel substrate having opposing first and second surfaces, the first surface exposed to the interior of the motor vehicle;
    a deployment door formed in the panel substrate, the deployment door having a peripheral end surface connected to the surrounding panel substrate; and
    the connection between the deployment door and the surrounding panel substrate formed by a knit line defined by a re-melt flow boundary, whereby the knit line is a frangible seam by which the deployment door becomes disconnected from the surrounding panel substrate via deployment of the airbag assembly.

2. The interior panel of claim 1, wherein the outer periphery of the deployment door defines a reduced thickness portion having a thickness less than the thickness of the remainder of the deployment door.

3. The interior panel of claim 2, wherein the airbag assembly engages the reduced thickness portion of the deployment door.

4. The interior panel of claim 2, wherein the reduced thickness portion and the surrounding panel substrate define a groove.

5. The interior panel of claim 4, wherein the groove is square or rectangular in shape.

6. The interior panel of claim 4, wherein the groove is exposed to the interior of the vehicle.

7. The interior panel of claim 4, wherein the groove is exposed to the airbag assembly.

8. The interior panel of claim 4, wherein a portion of the airbag assembly engages the groove.

9. The interior panel of claim 4, wherein a width of the groove is greater than the thickness of the knit line.

10. The interior panel of claim 4, wherein interior panel is formed by injection molding, and wherein the groove is formed by a projection of the cavity or core to provide consistency to the size, shape and position of the groove.

11. The interior panel of claim 1, wherein the peripheral end surface is stepped to define a first end surface portion spaced inwardly from a second end surface portion, the second end surface portion being connected to the surrounding panel substrate.

12. The interior panel of claim 11, wherein the first end surface portion is exposed to the interior of the vehicle.

13. The interior panel of claim 1, wherein an end of the knit line is exposed to the interior of the vehicle.

14. A combination of an interior panel for a motor vehicle and an airbag module supported behind the interior panel, the combination comprising:

a panel substrate having opposing first and second surfaces, the first surface exposed to the interior of the motor vehicle;

a deployment door formed in the panel substrate, the deployment door having a peripheral end surface that is stepped to define a first end surface portion spaced inwardly from a second end surface portion, a groove formed by the space between the first end surface portion and the panel substrate;

the second end surface portion being connected to the surrounding panel substrate by a knit line defined by a re-melt flow boundary; and an airbag assembly engaging the deployment door, whereby the knit line is a frangible seam by which the deployment door becomes disconnected from the surrounding panel substrate via deployment of the airbag assembly.

15. The combination of claim 14, wherein the airbag assembly engages the deployment door in an area proximate the groove.

16. The combination of claim 14, wherein the groove is exposed to the interior of the vehicle.

17. The combination of claim 14, wherein the groove is exposed to the airbag assembly.

18. The combination of claim 14, wherein the first end surface portion is exposed to the interior of the vehicle.

19. The combination of claim 14, wherein interior panel is formed by injection molding, and wherein the groove is formed by a projection of the cavity or core to provide consistency to the size, shape and position of the groove.

* * * * *